(12) United States Patent
Boys

(10) Patent No.: US 8,639,191 B2
(45) Date of Patent: Jan. 28, 2014

(54) COMMUNICATION APPARATUS AND METHOD

(75) Inventor: John Talbot Boys, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 832 days.

(21) Appl. No.: 10/595,561

(22) PCT Filed: Oct. 29, 2004

(86) PCT No.: PCT/NZ2004/000274
§ 371 (c)(1),
(2), (4) Date: Feb. 6, 2007

(87) PCT Pub. No.: WO2005/043775
PCT Pub. Date: May 12, 2005

(65) Prior Publication Data
US 2007/0281625 A1    Dec. 6, 2007

(30) Foreign Application Priority Data
Oct. 31, 2003    (NZ) .......................................... 529291

(51) Int. Cl.
*H04B 1/38* (2006.01)

(52) U.S. Cl.
USPC ........................................................ 455/73

(58) Field of Classification Search
USPC ...................... 455/41.1, 41.2, 41.3
See application file for complete search history.

(56) References Cited

U.S. PATENT DOCUMENTS

| | | | |
|---|---|---|---|
| 3,829,836 A | 8/1974 | Clarke | |
| 4,428,078 A * | 1/1984 | Kuo | ............................. 455/3.06 |
| 4,636,771 A | 1/1987 | Ochs | |
| 5,084,864 A | 1/1992 | Turnbull et al. | |
| 5,293,308 A | 3/1994 | Boys et al. | |
| 5,583,525 A | 12/1996 | Nekomoto et al. | |
| 5,983,076 A | 11/1999 | Takasan et al. | |
| 6,005,475 A | 12/1999 | Takasan et al. | |
| 6,459,363 B1 * | 10/2002 | Walker et al. | ................. 375/238 |
| 7,023,301 B2 * | 4/2006 | Kawahara et al. | ............ 333/204 |
| 2002/0183003 A1 | 12/2002 | Chang et al. | |
| 2003/0232181 A1 * | 12/2003 | Simpson et al. | .............. 428/212 |

FOREIGN PATENT DOCUMENTS

| | | |
|---|---|---|
| JP | 55133652 | 3/1955 |
| JP | 50-2810 | 1/1975 |
| JP | 61224735 | 10/1986 |
| JP | 6-69839 | 3/1994 |

(Continued)

OTHER PUBLICATIONS

International Search Report for International Application No. PCT/NZ2004/000274, dated Feb. 14, 2005.

(Continued)

*Primary Examiner* — Ping Hsieh
*Assistant Examiner* — Ankur Jain
(74) *Attorney, Agent, or Firm* — Law Office of Richard F. Jaworski, PC

(57) ABSTRACT

A communication apparatus comprises a communication path capable of conveying communication signals, a communication device adapted to receive or generate VHF or UHF communication signals, and a near field antenna associated with the communication device. The near field antenna is provided sufficiently near to the communication path to couple VHF or UHF communication signals to or from the communication device to the communication path. A HID/IPT system and a communication method are also provided.

33 Claims, 4 Drawing Sheets

(56) References Cited

FOREIGN PATENT DOCUMENTS

| JP | 11225097 | 8/1999 |
| JP | 2003150247 | 5/2003 |
| WO | WO0141315 A2 | 6/2001 |
| WO | 01-50545 | 7/2001 |
| WO | WO-03/005380 | 1/2003 |

OTHER PUBLICATIONS

European Search Report No. 04793738.8, dated Apr. 29, 2010.
English translation of corresponding Taiwanese Office Action.

* cited by examiner

PRIOR ART

COMMUNICATION APPARATUS AND METHOD

CROSS REFERENCE TO PRIOR APPLICATION

This is a U.S. National Phase application under 35 U.S.C. §371 of International Patent Application No. PCT/NZ2004/000274, filed Oct. 29, 2004, which claims priority to New Zealand Patent Application Serial No. 529291, filed on Oct. 31, 2003. The International Application was published on May 12, 2005 as WO 2005/043775 A1 under PCT Article 21(2).

FIELD OF INVENTION

This invention relates to communication apparatus and methods, and has particular but not exclusive relevance to communication with or between one or more moveable devices.

BACKGROUND

There are many applications in which high bandwidth communication is required over a transmission line with a device that may be moveable relative to the transmission line.

One example is a communications network in an environment such as a hospital where imaging equipment needs to transmit or receive high volumes of data at various locations in the hospital. It can be difficult providing appropriate physical connections between the equipment and the transmission line. This problem is compounded if the equipment needs to be moved for use around a variety of physical locations.

Another example is communication with pick-up devices supplied with power from an energised track, such as an HID/IPT (High Efficiency Inductive Power Distribution/Inductive Power Transfer). HID/IPT systems are very popular for many practical applications. They can work in very harsh environments, as they transfer power without physical contact and are therefore tolerant of environmental hazards such as water, acids, dirt and grime. Yet they themselves produce no harmful residues.

In consequence HID/IPT systems can operate in factories where they provide high reliability and immunity to paint and fumes. They can also operate in Clean Rooms where the level of cleanliness is very high and the HID/IPT system is compatible.

The ability for communication with a device powered by an HID/IPT system is becoming increasingly important. HID/IPT systems usually transfer power to devices that have a task to perform, for example the devices may be carriages which perform automated processes or which are required to travel to a selected location. The tasks that the devices are to perform can be automated to a greater degree and made far more efficient by providing a means of communication between devices and/or between each device and a system control module.

A communications system for an HID/IPT system must share the same advantages as the HID/IPT system i.e. it must transfer information without physical contact and must be tolerant of a harsh environment yet produce no residues, or electromagnetic interference, itself.

HID/IPT systems operate in a wide range of environments where the power cables of the primary conductive path or track may be in air, or water, or even concrete. In these special circumstances it is unlikely that one particular type of communications system will be universally applicable.

In U.S. Pat. No. 6,005,475 a communications system where the HID/IPT track is tuned to two frequencies at the same time has been disclosed. This system has the advantages of low cost (as no additional conductors are required) and applicability, as wherever there is power there are communication signals as well. But the range of applicability of this technique is limited as the bandwidth that is available using pick-ups tuned to both a power frequency and a communications frequency at the same time is limited. In practice bandwidths of less than 50 kHz are to be expected. The method has the advantage that it is operable with all HID/IPT media, for example wood, concrete, water, and air. However, in many circumstances its bandwidth is simply too small.

Wider bandwidth communication systems use microwaves, for example adhering to standards such as IEEE 802.11a or b, but these bands are becoming congested and microwave is not acceptable by many potential users of HID/IPT systems. In factory conditions microwaves can also suffer from shadowing. This means that extra diversity must be introduced which adds to spectral clutter. Wideband systems can also use leaky feeders. These are essentially distributed antennas and radiate widely making compliance with emission standards difficult when wide bandwidths are needed. Leaky feeders are also very expensive. Other communications systems economise by using the HID/IPT cables to propagate radio signals as well and having antennas distributed around the track to receive the signals. These systems are effective but leak radiation as power wires are not good RF conductors, and consequently they have a restricted bandwidth and range.

In another system, which is disclosed in International Application WO03005380, a data cable runs alongside the primary power cable of an HID/IPT system. The conductors of the data cable are arranged in such a way as to keep coupling between the data cable and the power cable to a minimum, and therefore reduce "crosstalk". The frequency of the information signal in the data cable is typically less than 1 Megahertz and the transmission rate is about 10 to 150 kbit/s. This system requires a very specific geometric relationship between the data cable and the power cable.

SUMMARY OF INVENTION

It is an object of the present invention to provide communication apparatus or methods which overcome or ameliorate one or more disadvantages of known communication systems. Alternatively it is an object of the invention to at least provide the public with a useful alternative.

Accordingly in one aspect the invention consists in communication apparatus comprising:

a communication path capable of conveying communication signals, a communication device adapted to receive or generate VHF or UHF communication signals, and a near field antenna associated with the communication device, the near field antenna being provided sufficiently near to the communication path to couple VHF or UHF communication signals to or from the communication device to the communication path.

The near field antenna is preferably adapted to limit electromagnetic radiation therefrom.

In a preferred embodiment the near field antenna comprises an inductance, although a capacitive element could also be used.

The near field antenna may comprise a partial, single or multiple turn of a conductive material. The conductive material may be a thin metal track provided on a non-conductive planar substrate.

In a preferred embodiment the conductive material comprises one or more turns being approximately 5 mm to 15 mm in a lateral dimension and approximately 20 mm to 60 mm in a longitudinal dimension.

A shielding means may be provided to limit electromagnetic radiation. The shielding means preferably comprises a screen, and the screen is provided on one side of the coupling means and the communication path is provided on an opposite side of the coupling means.

The screen may be constructed of an electrically conductive material having a low magnetic permeability, and be provided on a side of the planar substrate opposite to a side of the substrate on which the metal track is provided.

The communication path most preferably comprises a transmission line in the form of a cable having two parallel conductors. The conductors may be separated by an insulating web.

The communication device is preferably moveable along the communication path and the near field antenna moves with the communication device and relative to the communication path to allow the communication device to receive or generate VHF or UHF communication signals to or from the communication path.

In a second aspect the invention consists in an HID/IPT system including:
a power supply path adapted to be energised by a power supply to provide an electromagnetic field associated with the power supply path;
one or more moveable pick-up devices associated with the power supply path and adapted to receive electrical energy from the electromagnetic field to supply a load;
a communication path capable of conveying communication signals,
a communication device provided on each of the one or more pick-ups, the communication device being adapted to receive or generate VHF or UHF communication signals; and
a coupling means associated with the communication device, the coupling means being provided sufficiently near to the communication path to couple VHF or UHF communication signals to or from the communication device to the communication path whereby the one or more pick-ups may communicate with each other or with a further device.

The further device may interface with a control system and may be directly connected to the communication path.

The coupling means preferably comprises a near field antenna.

In a third aspect the invention consists in a communication method, the method including the steps of:
providing a communication path capable of conveying communication signals;
providing a communication device, the communication device including a near field antenna provided near to the communication path, and either,
a) imposing a VHF or UHF communication signal on the communication path and using the near field antenna to provide the signal to the communication device, or
b) using the communication device to generate a VHF or UHF communication signal and using the near field antenna to provide the signal to the communication path.

In a fourth aspect the invention consists in a near field antenna comprising a thin planar substrate of a non-conductive material, a conductive track on one side of the substrate adapted to inductively or capacitively couple with a transmission line, and a screen provided on the other side of the substrate.

Further aspects of the invention, which should be considered in all its novel aspects, will become apparent to those skilled in the art upon reading the following description which provides at least one example of a practical application of the invention.

BRIEF DESCRIPTION OF THE DRAWINGS

One or more examples of applications of the invention will be described below with reference to the accompanying drawings in which.

DETAILED DESCRIPTION OF THE PREFERRED EMBODIMENTS

An example of the invention will be discussed below with reference to use in an HID/IPT system. However, the invention is applicable to communications systems for many other applications.

Figure 1:
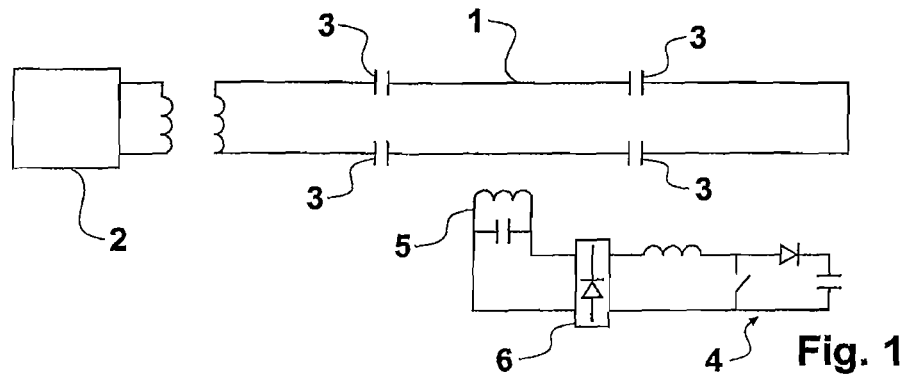
FIG. 1 is a diagrammatic illustration of a known HID/IPT system.

Referring to FIG. 1 a known HID/IPT system is shown. Such a system is described in U.S. Pat. No. 5,293,308, the contents of which are included by reference herein in their entirety. The system includes a conductive path 1 that is electrically energised by a power supply 2. The path 1 may include compensation capacitors 3. A device 4 is supplied with power from the path 1 by being selectively coupled to the path. Thus the device 4 has a tuned power pick-up circuit 5, rectifier bridge 6 and control components as described in U.S. Pat. No. 5,293,308 to provide power as required by a load.

The load supplied will vary upon the application of the system, and may for example be a light, or an electric motor. In many applications the path 1 will be provided along a rail or track on which bodies such as carriages are provided, and the load will include an electric motor which moves the carriage along the track.

As discussed above, communication with or between devices 4 is important to the operation and efficiency of such systems. For example, if the carriages are used to move articles through a manufacturing process area, it is important to know where each carriage is to avoid collisions or to correctly synchronise the manufacturing process. Communication can be used to allow each carriage to report its position, or to perform certain tasks.

Figure 2:
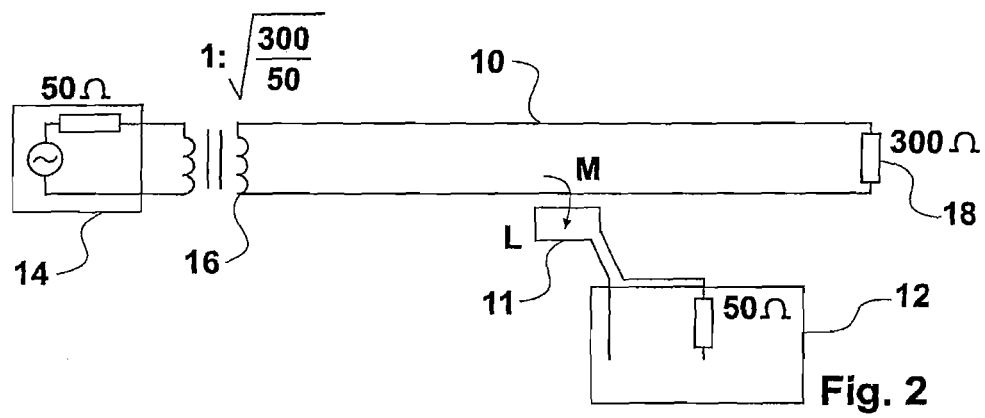
FIG. 2 is a diagrammatic illustration of a communication system according to the invention.

The present invention provides a communication system where IPT concepts may be applied to allow communication between devices. Referring to FIG. 2, an example of the communication system is shown having a communication path 10. Characteristically a suitable communication path is a transmission line that in principle does not radiate energy. It is preferably terminated with its characteristic impedance to avoid standing waves. A communication device 12 may transmit or receive (or both) VHF and/or UHF signals in the form of electrical energy to or from the path 10. For the purposes of this document the VHF band is 30 MHz to 300 MHz and the UHF band is 300 MHz to 3000 MHz. The device 12 includes, or is associated with, a near field antenna 11. Communication signals propagating in the communication path are in principle not disturbed by extraneous electromagnetic radiation, as parallel wire transmission lines neither radiate nor receive radiation. Thus the pathway is resistant to unwanted noise. However, near field disturbances can be coupled into or out of the path using near field antennas 11. These are essentially mutual inductances or capacitances that affect the two wires of the communication path differently. In FIG. 2 the near field antennas 11 are essentially inductors having inductance L which is coupled to path 10 by mutual inductance M. In this document reference to "near field antenna" refers to an antenna designed to operate in the very near field, preferably within approximately $\frac{1}{6}^{th}$ of a wavelength or 1 radian phase displacement.

In FIG. 2 a communication signal transmitter and/or receiver 14 (a 50-Ohm device in this example) is directly coupled to the path 10 which comprises a transmission line having a 300-Ohm characteristic impedance (such as 300-Ohm television ribbon) via a matching transformer 16. The path is terminated with its characteristic impedance, which in this example comprises a 300-Ohm resistor 18. The communication unit 14 may interface with a controller to communicate instructions to a device associated with communication unit 12.

Figure 3:
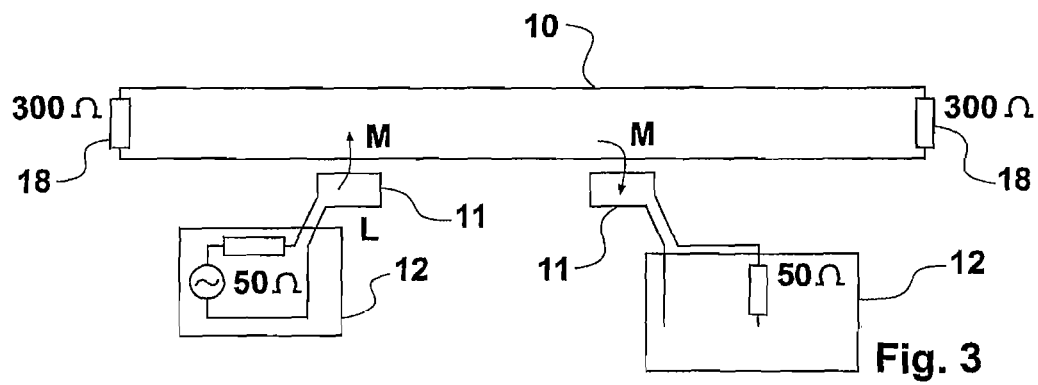
FIG. 3 is a diagrammatic illustration of another embodiment of a communication system according to the invention.

An alternative arrangement (using like reference numerals to designate like features) is shown in FIG. 3. The path 10 in this example is terminated at both ends with resistors 18 corresponding to the characteristic impedance of the cable that provides path 10, and two communication units are coupled to the path so that the path allows communication signals to be transmitted and/or received between the units 12.

Figure 14:
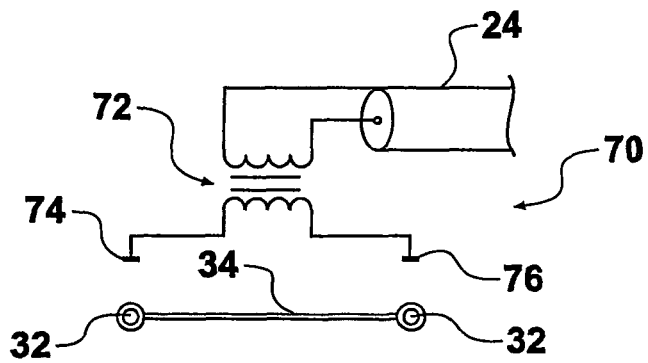
FIG. 14 is a diagrammatic end elevation in cross section of a capacitive near field antenna near a parallel conductor transmission line.
Figure 15:
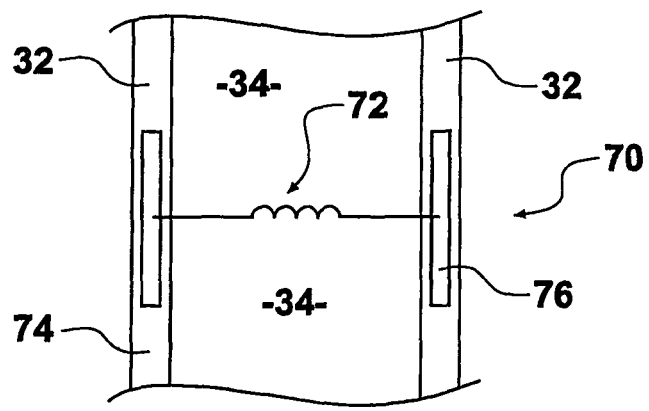
FIG. 15 is a partial plan view of the near field antenna shown in FIG. 14.

Conventional 2-wire transmission lines, such as the 300-Ohm ribbon cable described above are effective at propagating VHF and UHF signals with very little loss of signal over large distances, for example 100 meters or so. Such ribbon looks like a HID/IPT track and we have found that near-field antennas 11 can be used to insert or extract signals from the 300-Ohm ribbon. The near field antennas 11 are in the preferred form small mutual inductances that couple inductance L to the path 10. However, a near field antenna that is in effect primarily capacitive (that is to say is operative by primarily producing an electric field rather than a magnetic field) could alternatively be used (as shown in FIGS. 14 and 15). The mutually coupled near-field antennas are designed to be physically small, so that they themselves do not radiate. In practice this condition is easily met, and practical implementation of the near field antenna is discussed further below. The mutual inductance so formed is small, being of the order of 10 nH. However, at these frequencies (for example 320 MHz in a preferred embodiment) the radian frequency ($2\pi f$) is high (in the order of $2\times10^9$) so that the product $\omega M$ is a quite reasonable value (in this example 20 Ohms).

We have found that a 300-Ohm ribbon HID/IPT system with near field antennas behaves in a very similar manner to a 10-20 kHz HID/IPT system. However there are also significant differences. In both systems power is introduced at one end of the cable and may be extracted by pick-ups placed or moving along the track. The conventional track is terminated by a short circuit and at regular intervals along a (long) track compensation capacitors must be placed to prevent the driving voltage from becoming too high. The 300-Ohm ribbon cable is terminated in its characteristic impedance so no compensation capacitors are required. It is not practical to terminate the conventional HID/IPT system in its characteristic impedance as the power losses would be too high. For example, for a track with a track current of 80 A and a characteristic impedance of 180 Ohms the losses in a terminating resistor would be 1.15 MW and the operating voltage would be 14.4 kV. These differences apart, we have found that the two systems behave almost identically. The communication units 12 and their antennas 11 used with the 300-Ohm ribbon cable are very simple AC (RF) devices and are fully reversible. The near field antennas are designed to repel flux rather than attract it and do not require decoupling from the communication path as they do not have to be tuned and they place very little load on the track. Their reversibility is an advantage.

Figure 4:
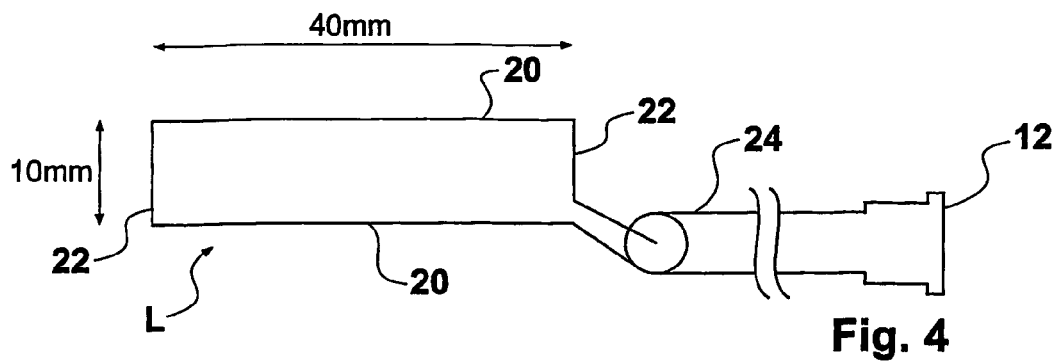
FIG. 4 is a sketch of a near field antenna.

One embodiment of a communications system is described below with reference to FIGS. 4 to 9. Referring to those Figures, an antenna for use with a 300-Ohm ribbon cable is a small single turn inductor (although those skilled in the art will realise that other physical arrangements may be used such as a partial turn or more than one turn) with a shape that is preferably rectangular as shown in FIG. 4. In that Figure, the longitudinal side 20 of the rectangular shape may be 20 mm to 60 mm (preferably 40 mm) for example, and the lateral (shorter) side 22 may be 5 mm to 15 mm (preferably 8 mm to match the width of the 300-Ohm ribbon) for example. The inductor may be formed using a printed circuit board (PCB) so that the majority of the conductive surface of the original board is etched away to leave the generally rectangular conductive strip. The inductor so formed is connected to the communication device 12, for example by a coaxial cable 24.

Figure 5:
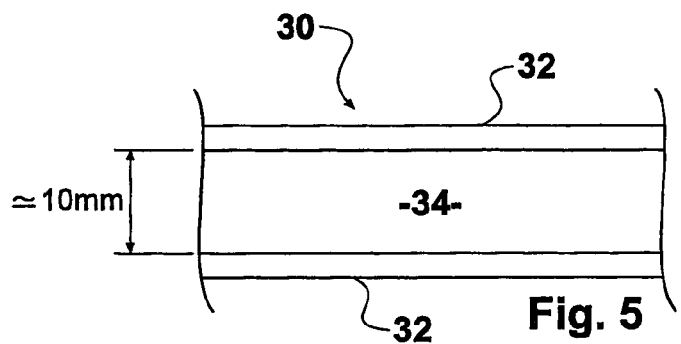
FIG. 5 is a partial elevation of a cable used in accordance with the invention.
Figure 6:
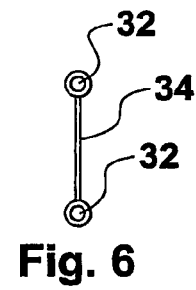
FIG. 6 is an end elevation of the cable of FIG. 5.

Turning to FIGS. 5 and 6, a portion of ribbon cable is shown, generally referenced 30, having two conductors 32 that are spaced approximately 10 mm apart being separated by an insulating web 34.

Figure 7:
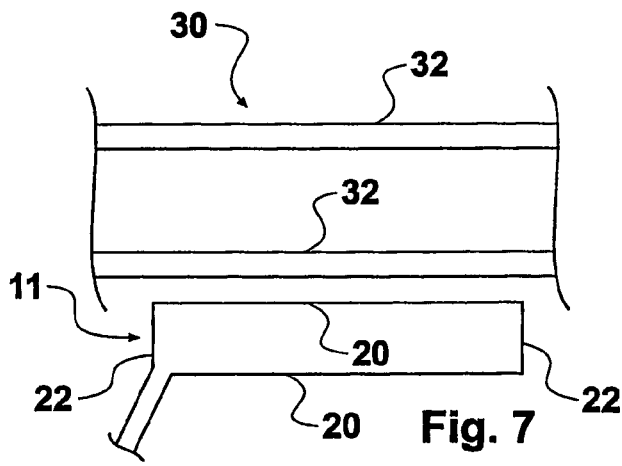
FIG. 7 is a diagrammatic elevation of the inductor of FIG. 4 in use relative to the cable of FIGS. 5 and 6.
Figure 8:
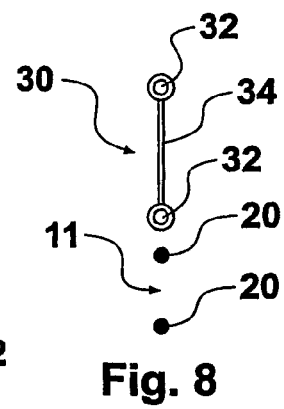
FIG. 8 is an end elevation of the arrangement shown in FIG. 7.

In FIGS. 7 and 8 the typical disposition of the antenna 11 relative to the ribbon cable is shown. A side 20 of the inductor L is placed parallel to, and in close proximity with (for example within 5 mm to 10 mm of) one of the conductors 32 of the ribbon. The antenna 11 and the ribbon are preferably in the same plane in this example. This antenna has a self-inductance of around 40 nH and a mutual inductance to the track of approximately 10 nH. If the antenna path 10 is truly in the near-field of the antenna then simple circuit theory may be used to calculate its performance. With the dimensions given as above and with a path comprising a 300-Ohm ribbon terminated in 300 Ohms at both ends, the calculated loss from one antenna driven by a 50 Ohm generator to another antenna is 49.5 dB; the measured loss in the same circumstances is 51 dB. Similarly if the ribbon is driven with a matching transformer to match 300 Ohms to a 50 Ohm generator the calculated loss from the generator to the antenna is 28 dB against a measured loss of 31 dB. For propagation in the opposite direction from the pick-up to the generator the figures are again 28 dB and 31 dB.

Figure 9:
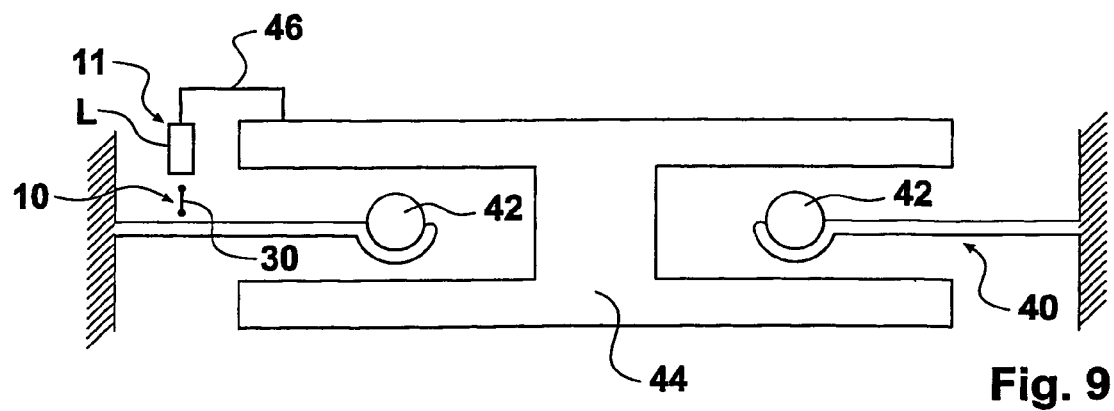
FIG. 9 is an end elevation in cross section showing the orientation of the communication path and antenna relative to the power conductors in an example of an HID/IPT application.

In FIG. 9 a diagrammatic cross section is shown through a rail assembly 40 of an IPT system installation. The rail supports the track or primary power conductors 42 which are arranged to allow passage of a power pick-up core 44. The communication conductor 10 (comprising ribbon 30) is shown provided on the rail assembly, and the antenna 11 is shown in close proximity to the ribbon, being supported by an arm 46 from the core so as to move with the core if necessary.

In an HID/IPT system the effect of a loaded antenna is to reflect an impedance back into the track. Thus a 3 kW load reflects a resistance of 0.469 Ohms back into a track with 80 A in it to produce the 3 kW (assuming no loss). Similarly the 300-Ohm ribbon also has a reflected impedance of approximately 0.7 Ohms induced in it. This is small compared with the characteristic impedance and has very little effect on the propagation of signals in the ribbon. With the ribbon an antenna sending power to the ribbon also sees a back-reflected impedance (again of 0.7 Ohms). This is small and even though it is a mismatch it has very little effect on the performance of the antenna or the ribbon.

Figure 10:
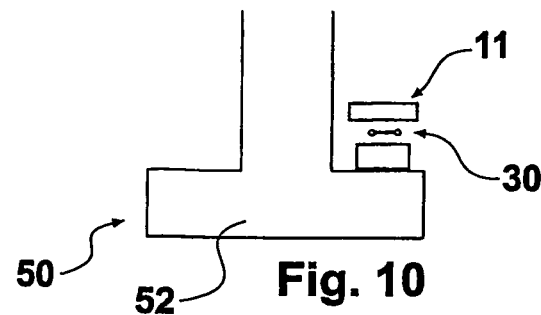
FIG. 10 is an end elevation is cross section of an alternative arrangement of a communication path and a near field antenna in an HID/IPT application.
Figure 11:
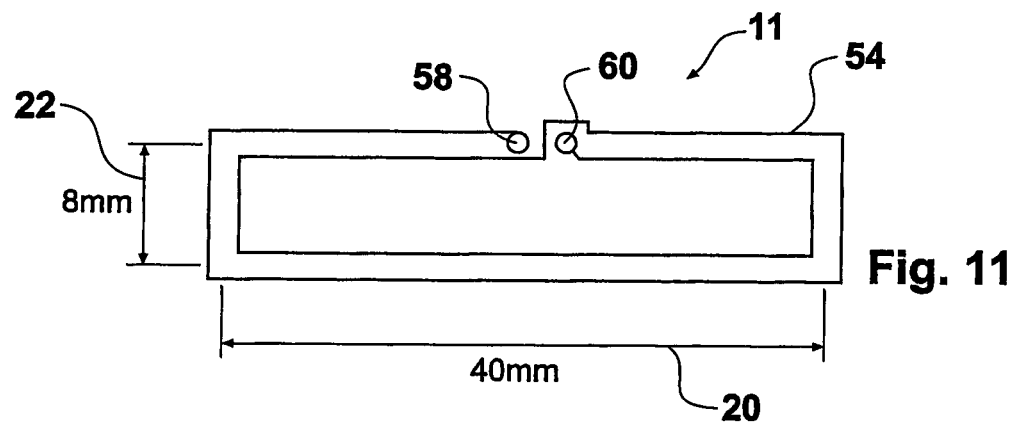
FIG. 11 is a plan view from below of the near field antenna of FIG. 10.
Figure 12:
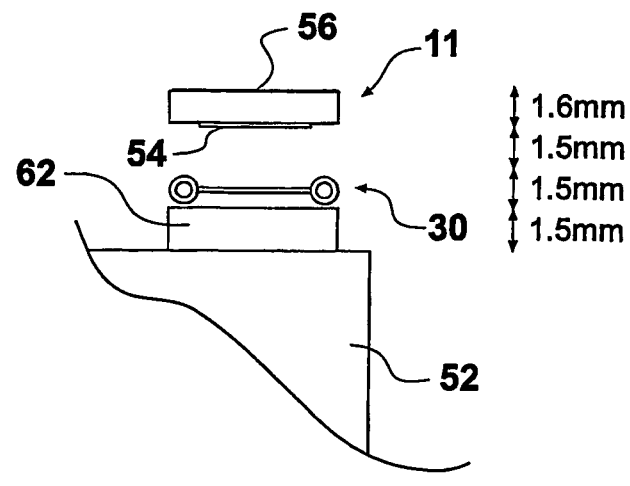
FIG. 12 is a partial view of the near field antenna and communication path of FIG. 10, showing the arrangement in greater detail.

Referring now to FIGS. 10 to 12, another embodiment will be described. In FIGS. 10 to 12, features that are the same as, or similar to, those of preceding Figures have the same reference numerals.

In FIG. 10, the ribbon 30 is shown provided on an alternative rail assembly 50 of an IPT system installation. For purposes of clarity, the primary power conductors are not shown, but are supported from structure 52 (which may comprise an "I" beam for example). The antenna 11 is provided in a plane substantially parallel to but above that of the ribbon 30.

Referring to FIG. 11, one side of the near field antenna 11 is shown in greater detail. As described above, the near field antenna may be constructed in a number of different ways, but is preferably formed from etching a PCB to provide track 54 which in this example forms a two-turn inductor. We have found that the near field antenna may be formed from a double sided printed circuit board to create two turns of narrow (preferably 1 mm) wide copper track about 1 mm apart on one side, and a copper screen 56 (not shown in FIG. 11, but illustrated in FIG. 12) on the other side. The screen 56 has a low magnetic permeability and therefore repels magnetic flux, so it acts as a "flux frightener" rather than HID/IPT system power transfer units which try to attract flux using ferrite or similar high permeability materials. We have made these on a double sided PCB laminate 1.6 mm thick (to give 1.6 mm between the loop and the screen behind it) and on two separate single sided laminates that were then glued together to get a thickness of 3.2 mm. Thicker antennas allow greater spacing between the 300 Ohm ribbon and the antenna. The distance from the ribbon to the physical structure (typically aluminium) it is attached to is preferably 1.6 mm for the 1.6 mm thick antennas but for larger separations 3-5 mm is preferred with the thicker antennas. The longitudinal dimension 20 is 40 mm in this example, and the lateral dimension 22 is 8 mm. We use a direct connection to a 50 Ohm coax cable with the central conductor going to one terminal 58 and the earth screen to the other terminal 60. We have found that we do not require any matching networks. We have also made antennas 30 mm long (i.e. 30 mm in the longitudinal dimension 20). These are slightly less sensitive (−2 to −3 dB). The length and width (i.e. the longitudinal and lateral dimensions respectively) may be changed as required. Increased width may be desirable for a wider ribbon to accommodate the greater spacing between the parallel conductors, or to allow greater spacing between the antenna and the ribbon (since a greater width may allow flux to extend further toward the ribbon). Increased length allows higher gain, although this needs to be kept relatively small (longitudinal dimension I<<wavelength) to prevent radiation and to communication in locations where the ribbon is bent around corners.

The PCB laminate is preferably cropped to extend about 20 mm from the loop in all directions to prevent radiation. Thus the screen 56 extends beyond the dimensions of the track 54. In cases where this is not possible we have found that the laminate may be cropped more closely where needed. The extra screening helps to suppress unwanted radiation. The result is a near field antenna that has very little radiation at the operating frequency of typically 320 MHz. Furthermore, the balanced and properly terminated ribbon 30 also radiates essentially no power.

Turning to FIG. 12, the arrangement of FIG. 10 is shown in greater detail. The ribbon 30 is spaced from the structure 52 by a spacer 62 (which is preferably constructed from a plastic material such as a plastics tape or web) which is approximately 1.5 mm high in this example. The ribbon may typically extend approximately 1.5 mm above the spacer, and the near field antenna may be provided about 1.5 mm to 5 mm above the ribbon, as discussed above. Therefore, the overall profile may be as low as about 3 mm without the near field antenna, and 6 mm-7 mm with the near field antenna.

Figure 13:
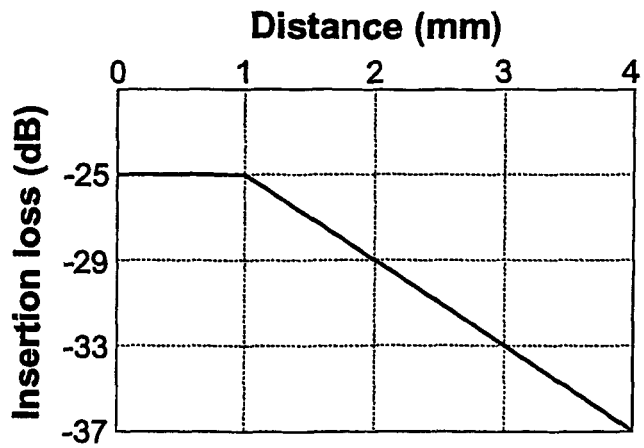
FIG. 13 is a graph of insertion loss against distance between a near field antenna as shown and described with reference to FIGS. 10 to 12 and a communication path comprising a 300-Ohm ribbon.

The structure 52 will often be aluminium, and we have found that this causes significant signal attenuation, for example up to 0.4 dB per meter. This together with the near field antenna design which is physically small, and may include screen 56 to limit any radiation, substantially prevents any power being radiated, and thus avoids EMI (Electromagnetic Interference) problems. Also, the extreme difference in the HID/IPT operating frequency (around 20 kHz) compared with the communications path operating frequency (around 320 MHz) prevents crosstalk from being an issue. In FIG. 13 a graph showing insertion loss (in dB) against distance (in mm) between the near field antenna described above with reference to FIG. 10 to 12 and the 300-Ohm ribbon 30 is shown. As can be seen, the loss increases linearly at 4 dB per mm after 1 mm separation (i.e. from approximately 0.1% of a wavelength).

FIGS. 14 and 15 show an alternative embodiment (using like reference numerals to designate like features) of the near field antenna in which the near field antenna is a capacitive near field antenna 70. The coaxial cable 24 which is connected to a communication device is coupled to the near field antenna 70 by a transformer 72. Each terminal of the other side of the transformer is connected to one of elongate conductors 74 and 76 which are each near to one of the parallel conductors 32 of the ribbon 30. The plan view in FIG. 15 omits the transformer detail and the coaxial cable for clarity. In use an electric field is formed between the near field antenna conductors 74 and 76 and the cable conductors 32, allowing near field disturbances to be coupled into and out of the ribbon 30.

From the foregoing it will be seen that an effective solution is provided to the problem of communications in IPT systems. Those skilled in the art will see that the communication system of the invention may also be used in non-HID/IPT applications, for example applications where vehicles or other bodies are powered by electrical and physical contact with a conductive path. Furthermore, the invention provides a communication system that allows high bandwidth without requiring a physical connection to be made between the communication apparatus. Therefore, the invention can eliminate problems associated with conventional plugs and sockets, and is particularly useful for use with devices that are moveable.

Throughout this document the word "comprise" and variations thereof is intended to be interpreted in an inclusive sense.

Where in the foregoing description reference has been made to specific components or integers of the invention having no equivalents, then such equivalents are herein incorporated as if individually set forth.

Although this invention has been described by way of example and with reference to possible embodiments thereof, it is to be understood that modifications or improvements may be made thereto without departing from the scope of the invention as defined in the appended claims.

The invention claimed is:

1. A communication system comprising:
    a communication path capable of conveying communication signals, the communication path comprising a cable having two substantially parallel separated conductors terminated with a resistance corresponding to a characteristic impedance of the communication path,
    a plurality of communication devices, each communication device adapted to receive and generate VHF or UHF communication signals,
    a near field antenna associated with each communication device, the near field antenna being coupled to the communication path, and provided sufficiently near to the communication path, to couple VHF or UHF communication signals to or from the communication device to the communication path,
    wherein an impedance of the near field antenna reflected onto the communication path is small compared to the characteristic impedance of the communication path, and
    wherein the near field antenna is provided on a non-conductive substrate including a plurality of tracks on one side and a shield on another side.

2. A communication system as claimed in claim 1 wherein the near field antenna is adapted to limit electromagnetic radiation therefrom.

3. A communication system as claimed in claim 1 wherein the communication path is provided in the very near field of the near field antenna.

4. A communication system as claimed in claim 1 wherein the near field antenna includes elongate conductors provided on a non-conductive planar substrate.

5. A communication system as claimed in claim 1 wherein the conductors are separated by an insulting web.

6. A communication system as claimed in claim 5 wherein the communication path comprises a ribbon cable.

7. A communication system as claimed in claim 1 wherein each communication device is directly coupled to the communication path.

8. A communication system as claimed in claim 1 wherein essentially no power is radiated from the communication path.

9. A communication system as claimed in claim 1 wherein the system allows bidirectional communication between each communication device and the communication path.

10. A communication system as claimed in claim 1 wherein each communication device is moveable along the communication path and the near field antenna for each communication device moves with the communication device and relative to the communication path to allow the communication device to receive or generate VHF or UHF communication signals to or from the communication path.

11. An HID/IPT system comprising:
    a power supply path adapted to be energized by a power supply to provide an electromagnetic field associated with the power supply path;
    a plurality of moveable pick-up devices associated with the power supply path and adapted to receive electrical energy from the electromagnetic field to supply a load;
    a communication path capable of conveying communication signals, the communication path comprising a cable having two substantially parallel separated conductors terminated with a resistance corresponding to a characteristic impedance of the communication path;
    a communication device provided on each of the plurality of moveable pick-up devices, the communication device being adapted to receive and generate VHF or UHF communication signals; and
    a coupling unit associated with each communication device, the coupling unit being coupled to the communication path to couple VHF or UHF communication signals to or from the communication device to the communication path whereby the one or more pick-ups may communicate with each other or with a further device, and wherein an impedance of each coupling unit reflected onto the communication path is small compared to the characteristic impedance of the communication path, and
    wherein the coupling unit is provided on a non-conductive substrate including a plurality of tracks on one side and a shield on another side.

12. An HID/IPT system as claimed in claim 11 wherein the further device interfaces with a control system.

13. An HID/IPT system as claimed in claim 11 wherein the further device is directly connected to the communication path.

14. An HID/IPT system as claimed in claim 11 wherein the coupling unit comprises a near field antenna.

15. An IPT/HID system as claimed in claim 11 wherein essentially no power is radiated from the communication path.

16. A communication method including comprising:
    providing a communication path capable of conveying communication signals, the communication path comprising a cable having two substantially parallel separated conductors terminated with a resistance corresponding to a characteristic impedance of the communication path;
    providing a plurality of communication devices, each communication device including a near field antenna coupled to the communication path wherein an impedance of each near field antenna reflected onto the communication path is small compared to the characteristic impedance of the communication path, and either,
    a) imposing a VHF or UHF communication signal on the communication path and using the near field antenna to provide the signal to one or more of the communication devices, or
    b) using one or more of the communication devices to generate a VHF or UHF communication signal(s) and using the near field antenna(s) to provide the signal to the communication path, and wherein the near field antenna is provided on a non-conductive substrate including a plurality of tracks on one side and a shield on another side.

17. A communication system comprising:
a communication path capable of conveying communication signals, the communication path comprising a cable having two substantially parallel separated conductors terminated with a resistance corresponding to a characteristic impedance of the communication path,
a plurality of communication devices adapted to receive and generate VHF or UHF communication signals, and
a near field antenna associated with each communication device, the near field antenna being coupled to the communication path and provided sufficiently near to the communication path to couple VHF or UHF communication signals to or from the communication device to the communication path, the near field antenna including a shielding device to limit electromagnetic radiation, and wherein an impedance of each near field antenna reflected onto the communication path is small compared to the characteristic impedance of the communication path, and
wherein the near field antenna is provided on a non-conductive substrate including a plurality of tracks on one side and a shield on another side.

18. A communication system as claimed in claim 17 wherein the communication path is provided in the very near field of the near field antenna.

19. A communication system as claimed in claim 17 wherein the near field antenna comprises a partial, single or multiple turn of a conductive material.

20. A communication system as claimed in claim 19 wherein the conductive material comprises a thin metal track provided on a non-conductive planar substrate.

21. A communication system as claimed in claim 20 wherein the conductive material comprises one or more turns being approximately 5 mm to 15 mm in a lateral dimension and approximately 20 mm to 60 mm in a longitudinal dimension.

22. A communication system as claimed in claim 20 wherein the shielding device comprises a screen of a material having a low magnetic permeability, and the screen is provided on a side of the planar substrate opposite to a side of the substrate on which the metal track is provided.

23. A communication system as claimed in claim 17 wherein the shielding device comprises a screen, and the screen is provided on one side of near field antenna and the communication path is provided on an opposite of the near field antenna.

24. A communication system as claimed in claim 17 wherein the conductors are separated by an insulating web.

25. A communication system as claimed in claim 24 wherein the communication path comprises a ribbon cable.

26. A communication system as claimed in claim 17 wherein each communication device is directly coupled to the communication path.

27. A communication system as claimed in claim 17 wherein essentially no power is radiated from the communication path.

28. A communication system as claimed in claim 17 wherein the system allows bidirectional communication between each communication device and the communication path.

29. A communication system as claimed in claim 17 wherein each communication device is moveable along the communication path and the near field antenna for each communication device moves with the communication device and relative to the communication path to allow the communication devices to receive or generate VHF or UHF communication signals to or from the communication path.

30. An HID/IPT system comprising:
a power supply path adapted to be energized by a power supply to provide an electromagnetic field associated with the power supply path;
a plurality of moveable pick-up devices associated with the power supply path and adapted to receive electrical energy from the electromagnetic field to supply a load;
a communication path capable of conveying communication signals, the communication path comprising a cable having two substantially parallel separated conductors terminated with a resistance corresponding to a characteristic impedance of the communication path;
a communication device provided on each of the plurality of pick-ups, each communication device being adapted to receive and generate VHF or UHF communication signals; and
a coupling unit associated with each communication device, the coupling unit being coupled to the communication path, and provided sufficiently near to the communication path to couple VHF or UHF communication signals to or from the communication device to the communication path whereby the one or more pick-ups may communicate with each other or with a further device, wherein an impedance of each coupling unit reflected onto the communication path is small compared to the characteristic impedance of the communication path, and the coupling unit including a shielding device to limit electromagnetic radiation, and
wherein the coupling unit is provided on a non-conductive substrate including a plurality of tracks on one side and a shield on another side.

31. An HID/IPT system as claimed in claim 30 wherein the further device interfaces with a control system.

32. An HID/IPT system as claimed in claim 30 wherein the further device is directly connected to the communication path.

33. An HID/IPT system as claimed in claim 30 wherein the coupling unit comprises a near field antenna.

* * * * *